United States Patent
Gupta et al.

(10) Patent No.: US 9,648,063 B1
(45) Date of Patent: May 9, 2017

(54) PERSONALIZED CONTENT DELIVERY USING A DYNAMIC NETWORK

(71) Applicant: Samsung Electronics Co., Ltd., Gyeonggi-Do (KR)

(72) Inventors: Noopur Gupta, San Jose, CA (US); Edmund D. Zink, Nashville, TN (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 14 days.

(21) Appl. No.: 14/933,700

(22) Filed: Nov. 5, 2015

(51) Int. Cl.
| | | |
|---|---|---|
| *H04M 3/42* | (2006.01) | |
| *H04L 29/06* | (2006.01) | |
| *H04W 4/02* | (2009.01) | |
| *H04W 8/00* | (2009.01) | |
| *H04B 7/155* | (2006.01) | |
| *G01S 5/02* | (2010.01) | |
| *H04W 88/04* | (2009.01) | |

(52) U.S. Cl.
CPC ........ *H04L 65/4061* (2013.01); *G01S 5/0252* (2013.01); *G01S 5/0289* (2013.01); *H04B 7/155* (2013.01); *H04W 4/023* (2013.01); *H04W 4/028* (2013.01); *H04W 8/005* (2013.01); *H04W 88/04* (2013.01)

(58) Field of Classification Search
CPC .. H04L 65/4061; H04W 4/023; H04W 8/005; H04W 4/028; H04W 88/04; H04B 7/155; G01S 5/0252; G01S 5/0289
USPC ..... 455/414.2, 404.2, 456.1, 457, 41.1, 41.2
See application file for complete search history.

(56) References Cited

U.S. PATENT DOCUMENTS

| | | |
|---|---|---|
| 8,489,112 B2 | 7/2013 | Roeding et al. |
| 8,660,581 B2 | 2/2014 | Davis et al. |
| 8,768,379 B2 | 7/2014 | Busch |
| 8,866,673 B2 | 10/2014 | Mendelson |
| 8,941,485 B1 | 1/2015 | Nendelson |
| 8,942,995 B1 | 1/2015 | Kerr |
| 2005/0149398 A1 | 7/2005 | McKay |
| 2008/0318591 A1 | 12/2008 | Oliver |
| 2010/0130251 A1* | 5/2010 | Chu ................. H04M 1/72544 455/556.1 |
| 2012/0179812 A1* | 7/2012 | Keller, III ............... F41A 17/06 709/224 |

(Continued)

OTHER PUBLICATIONS

"iInside," [online] iInside a wirelessWERX company, retrieved Nov. 5, 2015, retrieved from the Internet: <http://www.iinside.com>, 3 pg.

*Primary Examiner* — Dominic Rego
(74) *Attorney, Agent, or Firm* — Cuenot, Forsythe & Kim, LLC (57) ABSTRACT

Personalized content delivery using a dynamic network may include, using a processor, continually receiving, from each of a plurality of mobile devices, a location of the mobile device and a list specifying at least one RF device detected by the mobile device while at the location; and, estimating, using the processor, location information for the RF devices according to the locations and the lists. Using the processor, a determination may be made that a first RF device from the lists is proximate to a stationary presentation device. Responsive to the determining and using the processor, content may be provided to the stationary presentation device. The content may be selected, at least in part, according to the location information of the first RF device.

20 Claims, 4 Drawing Sheets

(56) References Cited

U.S. PATENT DOCUMENTS

| | | |
|---|---|---|
| 2012/0182172 A1 | 7/2012 | Sorensen |
| 2012/0268253 A1* | 10/2012 | Tuttle ..................... G01S 11/10 340/10.1 |
| 2013/0091452 A1 | 4/2013 | Sorden et al. |
| 2014/0046888 A1 | 2/2014 | Husain et al. |
| 2014/0309867 A1 | 10/2014 | Ricci |
| 2014/0365334 A1 | 12/2014 | Hurewitz |
| 2014/0378166 A1* | 12/2014 | Hong ..................... H04W 4/04 455/456.3 |
| 2015/0051994 A1 | 2/2015 | Ward et al. |
| 2015/0058129 A1 | 2/2015 | Nevid et al. |
| 2015/0073980 A1 | 3/2015 | Griffin et al. |
| 2015/0080016 A1* | 3/2015 | Smith ................. H04L 65/1006 455/456.1 |
| 2015/0365898 A1* | 12/2015 | Matsushita ......... H04M 1/7253 455/574 |
| 2016/0127486 A1* | 5/2016 | Chen .................. G06F 3/04817 709/206 |
| 2016/0134620 A1* | 5/2016 | Morrison ............ H04L 63/0823 726/6 |
| 2016/0261979 A1* | 9/2016 | Vaccari ................... H04W 4/02 |
| 2016/0373532 A1* | 12/2016 | Ilan ....................... H04L 67/141 |

\* cited by examiner

PERSONALIZED CONTENT DELIVERY USING A DYNAMIC NETWORK

TECHNICAL FIELD

This disclosure relates to delivering personalized content using a dynamic network and, more particularly, to delivering personalized content using a dynamic network formed of mobile, location aware devices.

BACKGROUND

The ability to provide useful and timely information to users is contingent upon a variety of factors. These factors may include, among other things, obtaining accurate location information for users. Often, the ability to obtain accurate location information is dependent upon users' voluntary participation in, and/or registration with, a service. Within an indoor environment, obtaining accurate location information may be even more challenging.

One common approach to indoor location determination relies upon an installed network of strategically placed, stationary beacons. The beacons estimate users' locations by detecting mobile devices. The beacons may share location data with a backend system that may then push content to the users' mobile devices. Users typically opt in to the service by installing an application on their mobile devices to facilitate communication with the backend system.

SUMMARY

A method may include, using a processor, continually receiving, from each of a plurality of mobile devices, a location of the mobile device and a list specifying at least one RF device detected by the mobile device while at the location, estimating, using the processor, location information for the RF devices according to the locations and the lists, and determining, using the processor, that a first RF device from the lists is proximate to a stationary presentation device. The method may also include, responsive to the determining and using the processor, providing content to the stationary presentation device. The content may be selected, at least in part, according to the location information of the first RF device.

A system may include a processor programmed to initiate executable operations. The executable operations may include continually receiving, from each of a plurality of mobile devices, a location of the mobile device and a list specifying at least one RF device detected by the mobile device while at the location, estimating location information for the RF devices according to the locations and the lists, and determining that a first RF device from the lists is proximate to a stationary presentation device. The executable operations may also include, responsive to the determining, providing content to the stationary presentation device. The content may be selected, at least in part, according to the location information of the first RF device.

A computer program product may include a computer readable storage medium having program code stored thereon. The program code may be executable by a processor to perform a method. The method may include, using the processor, continually receiving, from each of a plurality of mobile devices, a location of the mobile device and a list specifying at least one RF device detected by the mobile device while at the location, estimating, using the processor, location information for the RF devices according to the locations and the lists, and determining, using the processor, that a first RF device from the lists is proximate to a stationary presentation device. The method may also include, responsive to the determining and using the processor, providing content to the stationary presentation device, wherein the content is selected, at least in part, according to the location information of the first RF device.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to delivering personalized content using a dynamic network of location aware devices. In accordance with the inventive arrangements described within this disclosure, a network of location aware devices may be formed dynamically. The location aware devices may be mobile devices. As the mobile devices are carried about by users, the mobile devices may detect the presence of one or more other radio frequency (RF) devices. The mobile devices, being location aware, may report information such as the current location of the mobile devices and a list of any RF devices detected by the mobile device at the location. A backend system may receive information from participating mobile devices. Using the received locations and associated lists from the mobile devices, the system may estimate location information for the detected RF devices.

In one arrangement, the system may determine when one or more of the RF devices is located proximate to a presentation device. The presentation device may be stationary. Responsive to determining that an RF device is located proximate to the presentation device, the system may select content and send the content to the presentation device. The presentation device may render the content, thereby making the content available to the user of the detect RF device determined to be proximate to the presentation device.

In another arrangement, the system may select the content based upon the location information estimated for the RF device determined to be proximate to the presentation device. The selected content is personalized to the particular RF devices proximate to the presentation device. For example, the estimated location information for the RF device proximate to the presentation device may be cross-referenced with a map and/or points of interest to select the content.

While RF devices may be detected at various locations, the users of the RF devices may remain anonymous. The RF devices and/or users thereof, need not register or choose to participate in the service and/or system in order to receive personalized content. In addition, while the mobile devices may be location aware, the RF devices that are detected may not be location aware. These and other aspects of the inventive arrangements are described in further detail with reference to the figures.

Figure 1:
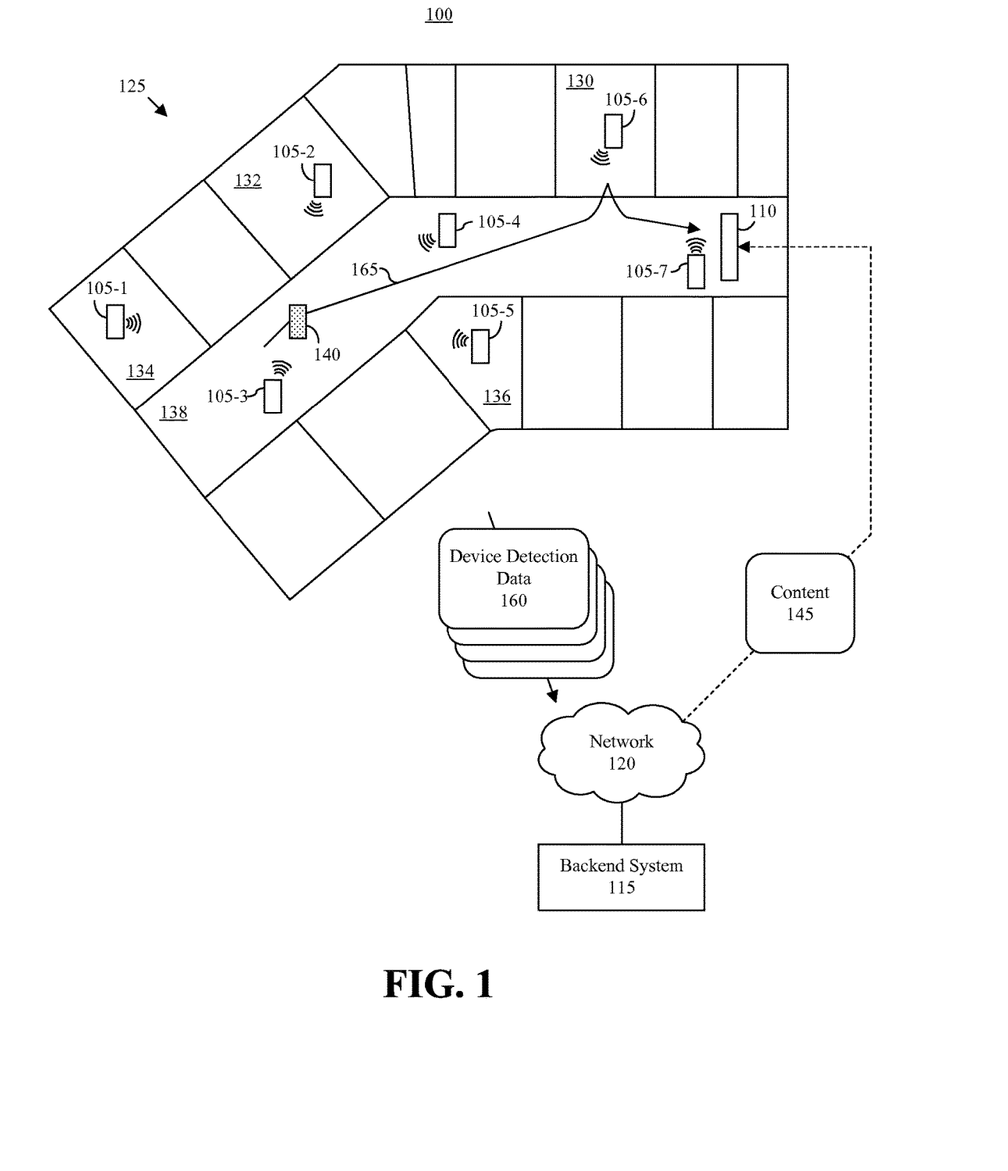
FIG. 1 is a diagram illustrating an exemplary network computing system.

FIG. 1 is a diagram illustrating an exemplary network computing system (system) 100. System 100 may include a plurality of mobile devices collectively referred to as mobile devices 105, a presentation device 110, and a backend system 115. For purposes of illustration and ease of description, the plurality of mobile devices 105 may include mobile devices 105-1, 105-2, 105-3, 105-4, 105-5, 105-6, and 105-7. Mobile devices 105 may communicate with backend system 115 through a network 120. Similarly, backend system 115 may communicate with presentation device 110 through network 120.

Network 120 is the medium used to provide communication links between various devices and data processing systems connected together within system 100. Network 120 may include connections, such as wire, wireless communication links, or fiber optic cables. Network 120 may be implemented as, or include, any of a variety of different communication technologies such as a Wide Area Network (WAN), a Local Area Network (LAN), a wireless network (whether LAN or WAN), a mobile network, a Virtual Private Network (VPN), the Internet, the Public Switched Telephone Network (PSTN), or the like.

Mobile devices 105 may be location aware devices. For example, mobile devices 105 may be any of a variety of communication devices that include a short-range wireless network adapter (e.g., a receiver and/or transceiver) that is compliant with a short-range wireless interconnection and/or communication protocol. In one example, mobile devices 105 may include a Bluetooth® Low Energy compliant wireless network adapter. As such, mobile devices 105 are operable to detect other RF devices that are also configured for short-range wireless communication. Mobile devices 105 may also include a wireless network adapter that is operable to communicate over longer distances. For example, mobile devices 105 may include a mobile telephony transceiver, a Wi-Fi® enabled transceiver (e.g., an 802.11x compliant transceiver), or the like. Examples of mobile devices 105 may include mobile phones, tablet computers, portable and/or handheld computers, portable and/or handheld communication devices, and the like.

As pictured, mobile devices 105 may be distributed throughout an indoor environment. In the example of FIG. 1, mobile devices 105 are positioned throughout a structure 125. Structure 125 may be a building, whether for personal or business use. For example, structure 125 may be a business establishment, e.g., an office, a personal dwelling, a shopping mall, or the like. Structure 125 is provided for purposes of illustration only and is not intended as a limitation of the inventive arrangements disclosed herein. For example, structure 125 may include multiple floors, fewer rooms, more rooms and/or subdivided spaces, or the like.

As noted, mobile devices 105 may be location aware. The term "location aware," as used within this disclosure, means that the device is able to determine a current location of the device. Mobile devices 105 may be location aware using any of a variety of different location determination mechanisms and/or techniques. For example, mobile devices 105 may include Global Positioning System (GPS) receivers. In another example, mobile devices 105 may use detected wireless signals and/or access points to determine location. The particular manner in which mobile devices 105 determine location is not intended as a limitation of the embodiments described within this disclosure.

The location may be specified as a latitude and longitude and optionally include an altitude. The location may be determined as a relative location within an indoor environment using detected access points or other known techniques for location determination. The location of mobile devices 105 may also be cross-referenced with a map of the indoor (or outdoor) environment and/or structure 125, points of interest within structure 125 such as stores, entrances and/or exits, restrooms, presentation device 110, and the like. For example, with regard to structure 125, mobile device 105-6 may determine its location to be within store 130; mobile device 105-2 may determine its location to be within store 132; mobile device 105-1 may determine its location to be within store 134, and mobile device 105-5 may determine its location to be within store 136. Similarly, mobile devices 150-3, 105-4, and 105-7 may determine their respective locations to be within hallway 138 and further determine other proximate points of interest such as store fronts.

As defined within this disclosure, the term "proximate" means within a predetermined distance of a reference location. The reference location may be a point of interest such as a store, presentation device 110, or one or more of mobile devices 105. In some cases, when referring to the detection of an RF device by one of mobile devices 105, the term "proximate" mean that the RF device is located within the detectable region of a mobile device 105.

As defined within this disclosure, the term "participating device" refers to a device of a user that has opted into using a particular service. Opting into to using a particular service may include registering for the service and/or installing an application that, when executed by the device, causes the device to perform operations as described herein. Mobile devices 105 are examples of participating devices. RF device 140 is not a participating device. In this regard, RF device 140 may be identified only by the unique identifier broadcast by RF device 140. The user of RF device 140, for example, may remain anonymous.

Presentation device 110 is configured to render content. Further, presentation device may be a stationary device intended to remain at a fixed or constant location for operation. Presentation device 110 may render content visually, audibly, and/or both visually and audibly. For example, presentation device 110 may include a display that may be used to visually present content, a speaker or other transducer to audibly play content, etc. Exemplary implementations of presentation device 110 may include, but are not limited to, a digital sign, a kiosk, or the like.

In one embodiment, presentation device 110 further may be implemented as a data processing system that includes a processor and a network adapter so that presentation device 110 may be coupled with other devices. In still another embodiment, presentation device 110 may include a short-range wireless network adapter thereby allowing presentation device 110 to detect other RF devices.

Backend system 115 may be implemented as a data processing system. In one arrangement, backend system 115 may be implemented as a computer system such as a server or a plurality of interconnected computer systems. Backend system 115 may receive device detection data 160 from mobile devices 105, determine location information for one or more detected RF devices such as RF device 140, and provide content 145 to presentation device 110 as described herein.

In one embodiment, mobile devices 105 may be carried about by users within structure 125. Mobile devices 105, being equipped with short-range wireless network adapters, may be configured to detect RF devices that are within a detectable range. For example, mobile devices 105-3, 105-4, 105-6, and 105-7 may detect RF device 140 as RF device 140 is carried along path 165. Each of mobile devices 105-3, 105-4, 105-6, and 105-7 may detect RF device 140 and determine a unique identifier for RF device 140. In this example, mobile devices 105-3, 105-4, 105-6, and/or 105-7 need not complete a pairing operation with RF device 140. For purposes of location estimation, it is sufficient that mobile devices 105-3, 105-4, 105-6, and 105-7 detect RF device 140 without being paired.

Mobile devices 105 may send device detection data 160 to backend system 115. Mobile devices 105 may send device detection data 160 on a continuing basis. Mobile devices 105 may send device detection data 160 from time-to-time, periodically, and/or responsive to a particular event. For example, mobile device 105-3 may be located in the particular location illustrated in FIG. 1. Mobile device 105-3 may detect RF device 140 and/or one or more other RF devices while at the location. Mobile device 105-3 may send device detection data 160 to backend system 115. Device detection data may include a location of the mobile device (i.e., mobile device 105-3 in this example) and a list of the RF devices detected while at the specified location. In one arrangement, the list of RF devices may optionally include a time stamp of when each of the RF devices was detected. In another arrangement, the list of RF devices may also include a signal strength indicator for each of the RF devices on the list.

Other mobile devices 105 also may send device detection data 160. In this example, mobile device 105-4 may send device detection data 160 to backend system 115 indicating that RF device 140 was detected. Mobile device 105-6 may send device detection data 160 indicating that RF device 140 was detected. Mobile device 105-7 may send device detection data 160 indicating that RF device 140 was detected.

Backend system 115 may receive device detection data 160 from mobile devices 105. For example, device detection data 160 received from each of mobile devices 105-3, 105-4, 105-6, and 105-7 may specify the location of each respective mobile device 105 and a list of the RF devices detected by the mobile device at that location. As noted, device detection data 160 may optionally include time information and/or signal strength indicators for the detected RF devices. Further, device detection data 160 may include multiple data sets from same mobile devices 105. For example, mobile device 105-6 may send multiple sets of device detection data, e.g., a set of device detection data once per minute or at some other interval.

Using device detection data 160 from mobile devices 105, backend system 115 may determine that RF device 140 was detected by mobile devices 105-3, 105-4, 105-6, and 105-7 in this example with each of mobile devices 105-3, 105-4, 105-6, and 105-7 being located at the location shown in FIG. 1. Further, backend system 115 may estimate that RF device 140 has traversed path 165 using locations of mobile devices 105-3, 105-4, 105-6, and 105-7 and timestamps from respective ones of mobile devices 105. Backend system 115, for example, ay also determine which stores were passed by RF device 140 while traversing path 165 and that RF device 140 entered store 130.

In one example, using the known range of the short-range wireless network adapters of mobile devices 105 and/or signal strength indicators, backend system 115 may estimate the distance of RF device 140 from the each of mobile devices 105-3, 105-4, 105-6, and 105-7 when detected. For example, by virtue of the fact that mobile device 105-3 detected RF device 140, backend system 115 may estimate that RF device 140 was located within a detectable range of mobile device 105-3. Using the signal strength indicator, backend system 115 may determine a more refined or accurate estimate of the distance of RF device 140 from mobile device 105-3.

In one embodiment, backend system 115 may determine that RF device 140 is proximate to presentation device 110 using the estimated location information determined by processing device detection data 160 received from mobile devices 105. In another embodiment, presentation device 110 may also send device detection data. In that case, backend system 115 may determine that RF device 140 is proximate to presentation device 110 based, at least in part, upon device detection data specifying RF device 140 as received from presentation device 110.

Figure 2:
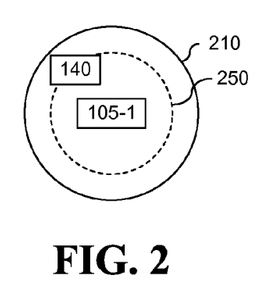
FIG. 2 illustrates an example of a detectable range of a mobile device.
Figure 3:
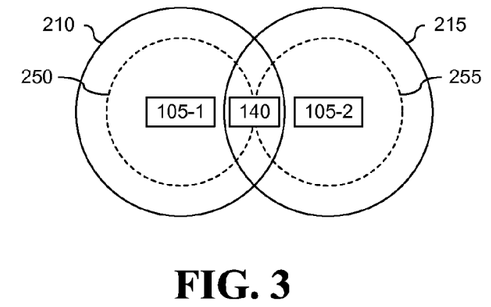
FIG. 3 illustrates an example of overlapping detectable ranges of mobile devices.
Figure 4:
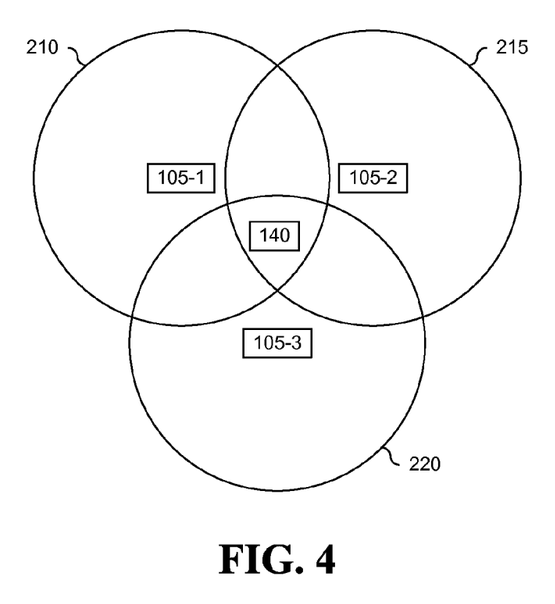
FIG. 4 illustrates another example of overlapping detectable ranges of mobile devices.

FIGS. 2-4 are diagrams illustrating the detection of RF devices using mobile devices. FIGS. 2-4 illustrate how accuracy in estimating the location of RF devices may be increased using the signal strength indicator of the detected RF device and/or the detection of an RF device by more than one mobile device.

FIG. 2 illustrates an example of a detectable range of a mobile device. More particularly, FIG. 2 illustrates mobile device 105-1 having a detectable range of 210. As defined within this disclosure, the term "detectable range" means the area extending out from a mobile device within which another RF device may be detected using a short-range wireless network adapter. As noted, one example of a short-range wireless network adapter is a Bluetooth receiver such as a BLE network adapter.

Accordingly, mobile device 105-1 may detect another RF device such as RF device 140 when located within detectable range 210. As discussed, mobile device 105-1 may detect RF device 140 and determine a unique identifier for RF device 140 that may be broadcast by RF device 140 without actually pairing with RF device 140. Further, upon detecting RF device 140, mobile device 105-1 may log the signal strength of RF device 140. The signal strength may be used to calculate a likely distance from mobile device 105-1 that RF device 140 is located. Thus, while detection of RF device 140 by mobile device 105-1 may mean that RF device 140 may be located anywhere within detectable range 210, backend system 115 may use the signal strength indicator to calculate that RF device 140 may be located a distance (e.g., a radius) from mobile device 105-1 represented by dashed line 250. As such, backend system 115 may estimate that RF device 140 may be located anywhere along dashed line 250.

FIG. 3 illustrates an example of overlapping detectable ranges of mobile devices. More particularly, FIG. 3 illustrates mobile device 105-1 having detectable range of 210 and mobile device 105-2 having a detectable range of 215. Mobile device 105-1 may detect RF device 140 when located within detectable range 210. Mobile device 105-2 may detect RF device 140 when located within detectable range 215. In the event that each of mobile devices 105-1 and 105-2 detect RF device 140 concurrently or within a predetermined amount of time of one another, the area in which RF device 140 may be estimated to be located may be within the intersection of detectable range 210 and detectable range 215. In this example, since RF device 140 and mobile devices 105-1 and 105-2 may be indoors and carried by users while walking, two detection times within 1, 2, 3, 4, 5, or up to approximately 10 seconds may be considered concurrent.

Further, each of mobile devices 105-1 and 105-2 may log the signal strength received for RF device 140. The signal strength may be used to calculate an estimated distance from each of mobile devices 105-1 and 105-2 that RF device 140 is located. For example, RF device 140 may be estimated to be anywhere along dashed line 250 with respect to mobile device 105-1. RF device 140 may be estimated to be anywhere along line 255 with respect to mobile device 105-2. Since mobile device 105-2 and 105-2 detected RF device 140 concurrently, the estimated location of RF device 140 may be limited to the intersection of line 250 and 255, thereby providing increased accuracy in the estimated location of RF device 140.

FIG. 4 illustrates another example of overlapping detectable ranges of mobile devices. More particularly, FIG. 4 illustrates mobile device 105-1 having detectable range of 210, mobile device 105-2 having detectable range of 215, and mobile device 105-3 having a detectable range of 220. Mobile device 105-1 may detect RF device 140 when located within detectable range 210. Mobile device 105-2 may detect RF device 140 when located within detectable range 215. Mobile device 105-3 may detect RF device 140 when located within detectable range 220. In the event that each of mobile devices 105-1, 105-2, and 105-3 detect RF device 140 concurrently (e.g., at a same time or within a particular amount of time of one another), the area in which RF device 140 may be estimated to be located may be within the intersection of detectable range 210, detectable range 215, and detectable range 220. As discussed, the times that mobile devices 105-1, 105-2, and 105-3 detect RF device 140 need not be exactly the same times.

Further, though not illustrated, each of mobile devices 105-1, 105-2, and 105-3 may log the signal strength received for RF device 140. The signal strength may be used to calculate an estimate of the distance from each of mobile devices 105-1, 105-2, and 105-3 that RF device 140 is located to further refine the estimated location of RF device 140.

As illustrated in FIGS. 2-4, the error in the estimated location of RF device 140 declines as the number of mobile devices 105 that detect RF device 140 concurrently or at least within a predetermined amount of time of one another increases. Thus, the larger the number of participating devices (e.g., mobile devices 105), the greater the accuracy in estimating locations of non-participating devices such as RF device 140.

In addition, when using location detection systems that rely upon stationary beacons, each beacon needs to be strategically located to detect passing RF devices. Further, the coverage area (e.g., detectable area) of the stationary beacons is static. Thus, any gaps in detectable area between stationary beacons remains unless additional beacons are added to the system to cover the gaps. In the case of leveraging mobile devices, placement is not an issue. Further, since users, on average, tend to visit popular areas and/or points of interest, a larger number of participating devices will tend to congregate or travel through these more desirable areas. Thus, coverage within these more desirable areas will have fewer gaps and provide higher accuracy in location estimation of non-participating devices. As such, the system is able to dynamically cover areas of increased user interest and/or popularity without having to reposition and/or redeploy stationary beacons or guess at what may be popular for purposes of stationary beacon placement.

Figure 5:
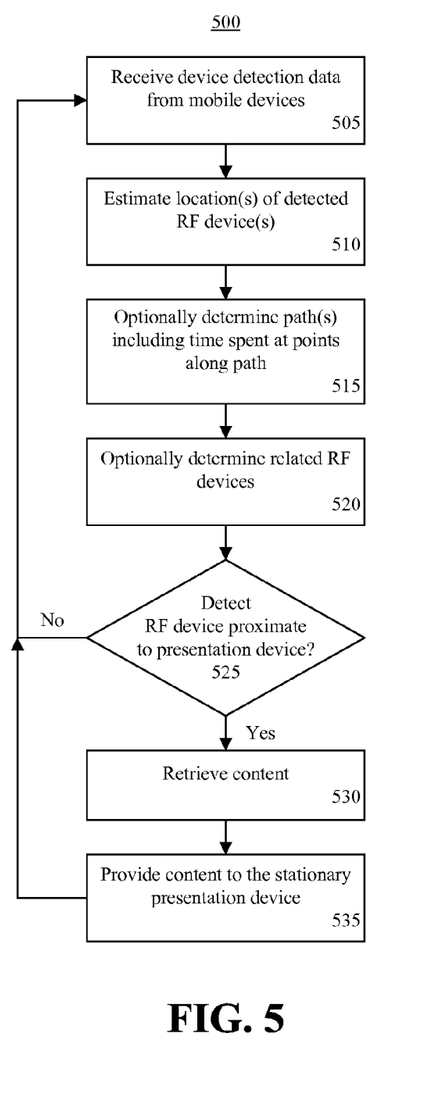
FIG. 5 is a flow chart illustrating an exemplary method of delivering content using a dynamic network.

FIG. 5 is a flow chart illustrating an exemplary method 500 of delivering personalized content using a dynamic network. Method 500 may be performed using a backend system as described with reference to FIG. 1. Method 500 may begin in a state where a plurality of mobile devices within an area. The area may be an indoor area or an outdoor area. The mobile devices may be participating devices and, as such, configured to detect RF devices and send device detection data to a backend system continually as described herein.

In block 505, the backend system may receive device detection data from the plurality of mobile devices. The backend system may receive the device detection data continually from the mobile devices. For example, the mobile devices may be configured to send device detection data periodically, from time-to-time, or responsive to a particular event. Examples of events that may cause a mobile device to send device detection data may include, but are not limited to, entering a particular store, leaving a particular store, first detecting a previously undetected RF device, or no longer detecting a previously detected RF device. In one aspect, the mobile devices may be configured to send device detection data on a continual basis when located within a particular area such as an indoor structure or when located within a predetermined geographic area.

In blocks 510-520, the backend system may calculate location information for the RF devices. In block 510, for example, the backend system may estimate the location for one or more RF devices. The backend system may estimate the location for those RF devices detected within received device detection data.

In block 515, the backend system may optionally determine a path for the selected device. The path may be a traveled path for the RF device. The path may be a set of estimated locations for the selected RF device ordered in time for a span of time such as an hour, several hours, a day, or the like. The path may include any points of interest along the path or within a predetermined distance of estimated locations forming the path. In determining paths of RF devices, the backend system further may determine the amount of time that the RF devices were detected at various locations. For example, an RF device may be detected by a same or different mobile devices for an extended period of time such as 20-30 minutes which may indicate a higher than normal level of interest in a point of interested at the location and/or along a path.

In block 520, the backend system may optionally detect groups of two or more RF devices that are related to each other. In general, RF devices determined to be related or otherwise associated with one another may be RF devices that are detected together. RF devices determined to be related, as described herein, may be referred to as "companion RF devices." For example, the backend system may determine that two or more RF devices are companion devices by determining that the RF devices are at a same estimated location concurrently, travel a same path or portion of a path concurrently, etc., using historical location information. In such cases, the two or more RF devices may belong to users that are friends, colleagues, family members, or the like.

Referring to blocks 510, 515, and 520, estimated location information, as determined by the backend system, may include one or more estimated locations of RF devices. Location information may also include one or more prior estimated locations (e.g., historical location data), paths estimated for RF devices using prior estimated locations and timestamps, etc. The prior estimated locations may be for the same day, prior days, and/or the like. Location information may also include amounts of time spent by RF devices at particular estimated locations. Further, location information may include map and/or point of interest data cross-referenced with estimated locations.

In block 525, the backend system may determine whether any of the RF devices are proximate to the stationary presentation device. For example, since the backend system may continually receive device detection data from the mobile devices, the backend system may also determine whether one or more of the RF devices is within a predetermined distance of the presentation device. The location of the presentation device may be known or preprogrammed within the backend system.

In another embodiment, the backend system may determine that an RF device is proximate to the presentation device responsive to receiving a notification from the presentation device. The presentation device may include a short-range wireless network adapter and, responsive to detecting an RF device, may send device detection data specifying the unique identifier of the detected RF device to the backend system. The backend system may receive device detection data from the presentation device indicating the detected RF device.

If the backend system determines that no RF device is proximate to the presentation device, method 500 may loop back to block 505 and continue processing. If the backend system determines that an RF device is proximate to the presentation device, method 500 may continue to block 520. For purposes of discussion, the RF device determined to be proximate to the presentation device is referred to as the "selected RF device."

In block 530, the backend system may retrieve content correlated with the selected RF device. The content that is retrieved is personalized, at least with respect to the selected RF device. The identity of the user of the selected RF device may remain unknown to the backend system. As such, anonymity of the user of the selected RF device is maintained while the backend system is able to deliver content that may be meaningful to the user of the selected RF based upon location information for the selected RF device. For example, as illustrated in FIG. 1, the backend system may determine that the selected RF device has traveled into store 130. In that case, the backend system may select content for store 130. The backend system may display an advertisement for store 130, information about a product carried by store 130, or the like.

The content retrieved further may be correlated with the selected RF device in that the retrieved content is also related to one or more locations visited by an RF device related to the selected RF device as determined in block 520. For example, the retrieved content may be content for a point of interest visited by both the selected RF device and the related RF device. In another example, the retrieved content may be content for a point of interested visited concurrently by both the selected RF device and the related RF device. In a further embodiment, backend system may only present content correlated with the selected RF device and the related RF device responsive to determining that both the selected RF device and the related RF device are proximate to the presentation device.

In block 535, the backend system may provide the content to the presentation device. For example, the backend system may retrieve an image, video, audio, and/or audiovisual material and provide the content to the presentation device. The presentation device may render the content whether by visually displaying, audibly playing, and/or a combination of visually displaying and audibly playing the content. In one aspect, the content may be retrieved responsive to the detection of the selected RF device and provided to the presentation device in real time for consumption by a user of the selected RF device.

The presentation device may render the received content for a predetermined amount of time, until the selected RF device is no longer within a predetermined distance of the presentation device, until different content is received responsive to detecting that another RF device is proximate to the presentation device, or the like. After block 535, method 500 may loop back to block 505 to continue processing.

The inventive arrangements described within this disclosure allow personalized content to be delivered to a user despite that user not opting to participate in a content delivery. Personalized content for the selected RF device may be delivered to the presentation device responsive to determining that the selected RF device is proximate to the presentation device without the user of the selected RF device being aware that the content being presented is personalized or directed to that user.

Figure 6:
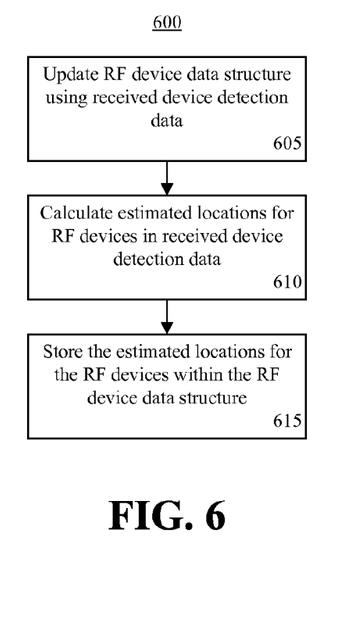
FIG. 6 is a flow chart illustrating an exemplary method of estimating location of an RF device.

FIG. 6 is a flow chart illustrating an exemplary method 600 of estimating locations of detected RF devices. Method 600 may be performed to implement block 510 of FIG. 5. In one aspect, the backend system may maintain an RF device data structure that stores device detection data. Exemplary data structures may include a database, a table, hierarchically formatted data such as an eXtensible Markup Language (XML) document, a text file such as a delimited file, or the like.

In block 605, the backend system may update the RF device data structure. In one arrangement, the backend system may maintain a database specifying each RF device identified within received device detection data. As device detection data is received from one or more different mobile devices, the backend system may extract the data for each RF device. For example, the backend system may extract data items such as the unique identifier of the RF device, the location of the mobile device that detected the RF device, optionally signal strength, and a timestamp indicating when the RF device was detected by the mobile device. The data items, collectively referred to as an entry, may be stored within the RF device data structure in a memory element.

This allows the entries to be easily sorted according to RF device, timestamp, or any other data item of the entry.

The backend system may analyze the entries for the RF devices. The analysis may be performed across mobile devices. For example, the entries for a given RF device may include entries obtained from multiple, different mobile devices. The entries indicate whether the RF device was detected simultaneously or concurrently by two or more different mobile devices, whether the RF device was detected over different days, and the like.

In block 610, for RF devices detected in the most recently received device detection data, the backend system may determine, or calculate, an estimated location for each of the RF devices. For example, for each RF device specified in the most recently received device detection data, the backend system may estimate a location for the RF device.

In one arrangement, where a single new entry is received for an RF device (there are no concurrent detections of the RF device by more than one mobile device), the backend system may calculate the location of the RF device to be the location of the particular mobile device that detected the RF device. In another example, where signal strength information is received, the backend system may adjust the estimate to be the location of the mobile device that detected the RF device with an offset determined according to the detected signal strength.

In another example, the backend system may estimate that the location of an RF device is within an intersection of two or more detectable ranges of two or more mobile devices that detect the RF device concurrently. The estimated location may be center of the intersection or overlapped detectable ranges. Further, as noted, the estimate may be further refined by accounting for the signal strength detected by each of the plurality of mobile devices that detected the RF device.

In block 615, the backend system may store the estimated location for each of the RF devices for which an estimated location is calculated within the data structure. In one aspect, the backend system may combine multiple entries used to determine one estimate. For example, the backend system may combine entries of concurrent detections of a same RF device.

Figure 7:
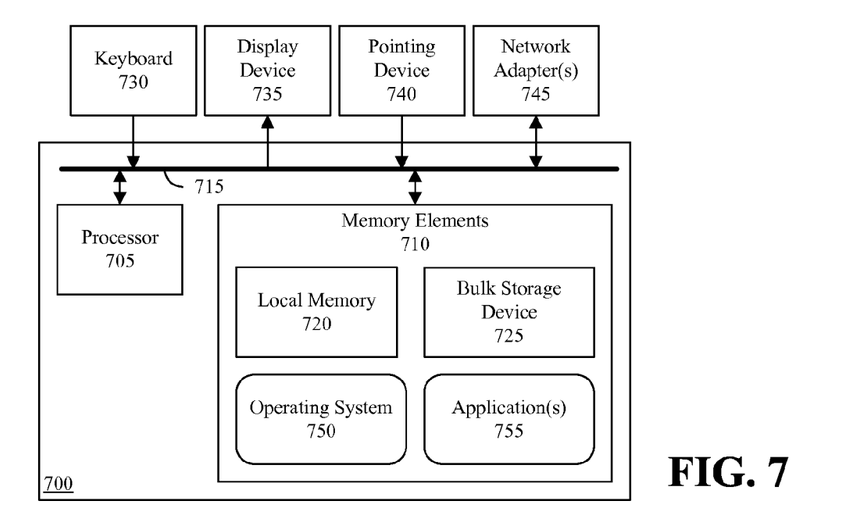
FIG. 7 is a block diagram illustrating an example of an architecture for a data processing system.

FIG. 7 is an exemplary architecture 700 for a data processing system. Architecture 700 may be used to implement any of a variety of systems and/or devices that include a processor and memory and that are capable of performing the operations described within this disclosure. In some cases, the particular device implemented using architecture 700 may include fewer components or more components. Further, the particular operating system and/or application(s) included may vary.

As pictured, architecture 700 includes at least one processor, e.g., a central processing unit (CPU), 705 coupled to memory elements 710 through a system bus 715 or other suitable circuitry. Architecture 700 stores program code within memory elements 710. Processor 705 executes the program code accessed from memory elements 710 via system bus 715. Memory elements 710 include one or more physical memory devices such as, for example, a local memory 720 and one or more bulk storage devices 725. Local memory 720 refers to random access memory (RAM) or other non-persistent memory device(s) generally used during actual execution of the program code. Bulk storage device 725 may be implemented as a hard disk drive (HDD), solid state drive (SSD), or other persistent data storage device. Architecture 700 may also include one or more cache memories (not shown) that provide temporary storage of at least some program code in order to reduce the number of times program code must be retrieved from bulk storage device 725 during execution.

Input/output (I/O) devices such as a keyboard 730, a display device 735, and a pointing device 740 may optionally be coupled to architecture 700. In some cases, one or more of the I/O devices may be combined as in the case where a touchscreen is used as display device 735. In that case, display device 735 may also implement keyboard 730 and pointing device 740.

The I/O devices may be coupled to architecture 700 either directly or through intervening I/O controllers. One or more network adapters 745 may also be coupled to architecture 700 to enable architecture 700 to become coupled to other systems, computer systems, remote printers, and/or remote storage devices through intervening private or public networks. Modems, cable modems, Ethernet cards, wireless transceivers, and wireless receivers are examples of different types of network adapter 745 that may be used with architecture 700. Depending upon the particular device implemented with architecture 700, the specific type of network adapter, or network adapters as the case may be, will vary.

As pictured in FIG. 7, memory elements 710 store an operating system 750 and one or more applications 755. In one aspect, operating system 750 and application(s) 755, being implemented in the form of executable program code, are executed by architecture 700. As such, operating system 750 and application(s) 755 may be considered an integrated part of architecture 700. Operating system 750, application(s) 755, and any data items used, generated, and/or operated upon by architecture 700 are functional data structures that impart functionality when employed as part of a system implemented using architecture 700.

In one embodiment, architecture 700 may be used to implement backend system 115. When using architecture 700 to implement backend system 115, application(s) 755 may program processor 705 to perform the various operations of backend system 115 described herein.

In another embodiment, architecture 700 may be used to implement stationary presentation device 110. When using architecture 700 to implement stationary presentation device 110, application(s) 755 may be used to receive content and render content. The content may be rendered and/or cycled through one or more different items for the duration that the selected RF device is determined to be proximate to stationary presentation device 110.

Figure 8:
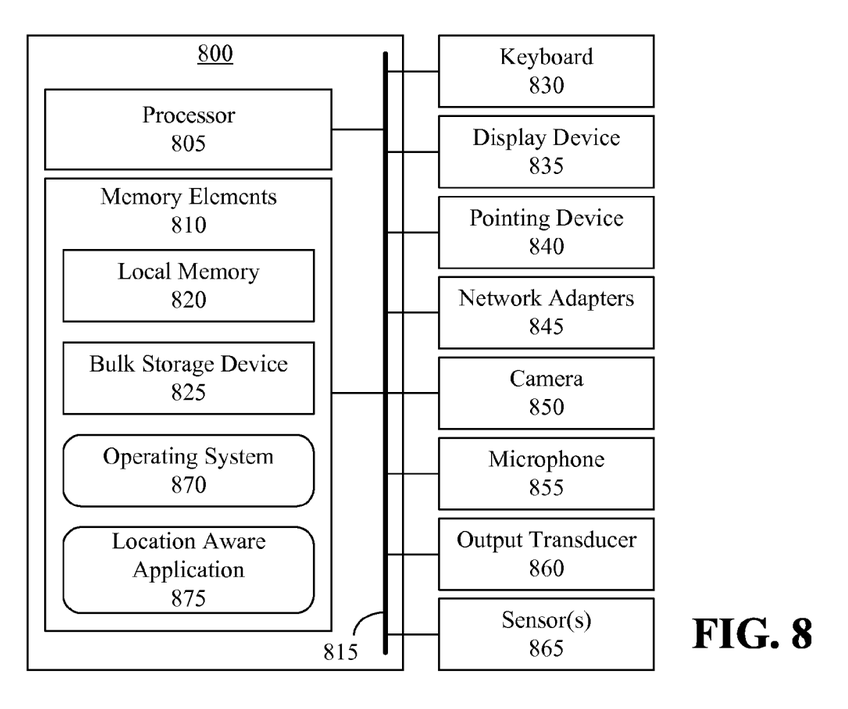
FIG. 8 is a block diagram illustrating an example of an architecture for a mobile device.

FIG. 8 is a block diagram illustrating an exemplary architecture 800 for a mobile device. Architecture 800 may be used to implement mobile devices 105, for example. Architecture 800 may include at least one processor 805 coupled to memory elements 810 through a system bus 815 or other suitable circuitry. Architecture 800 stores program code within memory elements 810. Processor 805 executes the program code accessed from memory elements 810 via system bus 815. Memory elements 810 include one or more physical memory devices such as, for example, a local memory 820 and one or more bulk storage devices 825.

Input/output (I/O) devices such as a keyboard 830, a display device 835, and a pointing device 840 may optionally be coupled to architecture 800. In some cases, one or more of the I/O devices may be combined as in the case where a touchscreen is used as display device 835. In that case, display device 835 may also implement keyboard 830 and pointing device 840.

Additional I/O devices may include one or more network adapters 845, an optional camera 850, an optional microphone 855, an optional output transducer (e.g., speaker) 860, and one or more optional sensors such as accelerometers, gyroscopes, and the like. Network adapter 845 enable architecture 800 to become coupled to other systems. Modems, cable modems, Ethernet cards, short and/or long range wireless receivers and/or transceivers are examples of different types of network adapter 845 that may be used with architecture 800. Depending upon the particular device implemented with architecture 800, the specific type of network adapter, or network adapters as the case may be, will vary. The I/O devices may be coupled to architecture 800 either directly or through intervening I/O controllers.

As pictured in FIG. 8, memory elements 810 store an operating system 850 and a location aware application 855. In one aspect, operating system 850 and location aware application 855, being implemented in the form of executable program code, are executed by architecture 800. As such, operating system 850 and location aware application 855 may be considered an integrated part of architecture 800. Operating system 850, location aware application 855, and any data items used, generated, and/or operated upon by architecture 800 are functional data structures that impart functionality when employed as part of a system implemented using architecture 800.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "content" may refer to a data item, file, or plurality of files. Exemplary content may include, but is not limited to, hyperlinks, images, files, advertising, audio, video, text, and/or combinations thereof.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions, e.g., "program code," for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the Figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

A method may include, continually receiving, from each of a plurality of mobile devices and using a processor, a location of the mobile device and a list including at least one RF device detected by the mobile device while at the location, estimating, using the processor, location information for the RF devices according to the locations and the lists, and, determining, using the processor, that a first RF device from the lists is proximate to a stationary presentation device. The method may include, responsive to the determining and using the processor, providing content to the stationary presentation device, wherein the content is selected, at least in part, according to the location information of the first RF device.

The first RF device may be a non-participating device and the plurality of mobile devices may be participating devices.

The method may include determining, from the locations and lists of the plurality of mobile devices, an amount of time the first RF device is proximate to a selected location. The content may also be selected according to the amount of time and the selected location.

The stationary presentation device and the plurality of mobile devices may be indoors.

The method may include determining that the first RF device is proximate to a second RF device determined to be a companion device from historical location information for the first and second RF devices. The content may also be selected according to location information estimated for the second RF device.

In another aspect, the lists may specify signal strength for detected RF devices. In that case, the method may include estimating location information for the RF devices by estimating a distance of the RF devices from the mobile devices that detected the RF devices according to the signal strength indicators.

Estimating location information for the RF devices may also include, for a selected RF device detected concurrently by at least two mobile devices, determining an intersection of the detectable ranges of the at least two mobile devices that detected the selected RF device.

Determining that the first RF device is proximate to the stationary presentation device may include receiving device detection data specifying the first RF device from the stationary display device.

A system may include a processor programmed to initiate executable operations. The executable operations may include continually receiving, from each of a plurality of mobile devices, a location of the mobile device and a list including at least one RF device detected by the mobile device while at the location, estimating location information for the RF devices according to the locations and the lists, and determining that a first RF device from the lists is proximate to a stationary presentation device. The executable operations may also include, responsive to the determining, providing content to the stationary presentation device, wherein the content is selected, at least in part, according to the location information of the first RF device.

The first RF device may be a non-participating device and the plurality of mobile devices may be participating devices.

The processor may be further programmed to initiate executable operations including determining, from the locations and lists of the plurality of mobile devices, an amount of time the first RF device is proximate to a selected location. The content may be selected according to the amount of time and the selected location.

The stationary presentation device and the plurality of mobile devices may be indoors.

The processor may be further programmed to initiate executable operations including determining that the first RF device is proximate to a second RF device determined to be a companion device from historical location information for the first and second RF devices. In that case, the content may also selected according to location information estimated for the second RF device.

In another aspect, the lists may further specify signal strength for detected RF devices. In that case, estimating location information for the RF devices may include estimating a distance of the RF devices from the mobile devices that detected the RF devices according to the signal strength indicators.

Estimating location information for the RF devices may also include, for a selected RF device detected concurrently by at least two mobile devices, determining an intersection of the detectable ranges of the at least two mobile devices that detected the selected RF device.

Determining that the first RF device is proximate to the stationary presentation device may include receiving device detection data specifying the first RF device from the stationary display device.

A computer program product may include a computer readable storage medium having program code stored thereon. The program code is executable by a processor to perform a method. The method may include, using the processor, continually receiving, from each of a plurality of mobile devices, a location of the mobile device and a list including at least one RF device detected by the mobile device while at the location, estimating, using the processor, location information for the RF devices according to the locations and the lists, and determining, using the processor, that a first RF device from the lists is proximate to a stationary presentation device. The method may also include, responsive to the determining and using the processor, providing content to the stationary presentation device, wherein the content is selected, at least in part, according to the location information of the first RF device.

The first RF device may be a non-participating device and the plurality of mobile devices may be participating devices.

The method may also include determining that the first RF device is proximate to a second RF device determined to be a companion device from historical location information for the first and second RF devices. The content may also be selected according to location information estimated for the second RF device.

Estimating location information for the RF devices further may include, for a selected RF device detected concurrently by at least two mobile devices, determining an intersection of the detectable ranges of the at least two mobile devices that detected the selected RF device.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    using a processor, continually receiving, from each of a plurality of mobile devices, a location of the mobile device and a list comprising at least one RF device detected by the mobile device while at the location;
    estimating, using the processor, location information for the RF devices according to the locations and the lists;
    determining, using the processor, that a first RF device from the lists is proximate to a stationary presentation device; and responsive to the determining and using the processor, providing content to the stationary presentation device, wherein the content is selected, at least in part, according to the location information of the first RF device.

2. The method of claim 1, wherein the first RF device is a non-participating device and the plurality of mobile devices are participating devices.

3. The method of claim 1, further comprising:
determining, from the locations and lists of the plurality of mobile devices, an amount of time the first RF device is proximate to a selected location;
wherein the content is further selected according to the amount of time and the selected location.

4. The method of claim 1, wherein the stationary presentation device and the plurality of mobile devices are indoors.

5. The method of claim 1, further comprising:
determining that the first RF device is proximate to a second RF device determined to be a companion device from historical location information for the first and second RF devices, wherein the content is further selected according to location information estimated for the second RF device.

6. The method of claim 1, wherein:
the lists further specify signal strength for detected RF devices; and
estimating location information for the RF devices further comprises estimating a distance of the RF devices from the mobile devices that detected the RF devices according to the signal strength indicators.

7. The method of claim 1, wherein estimating location information for the RF devices further comprises, for a selected RF device detected concurrently by at least two mobile devices, determining an intersection of the detectable ranges of the at least two mobile devices that detected the selected RF device.

8. The method of claim 1, wherein determining that the first RF device is proximate to the stationary presentation device comprises:
receiving device detection data specifying the first RF device from the stationary display device.

9. A system, comprising:
a processor programmed to initiate executable operations comprising:
continually receiving, from each of a plurality of mobile devices, a location of the mobile device and a list comprising at least one RF device detected by the mobile device while at the location;
estimating location information for the RF devices according to the locations and the lists;
determining that a first RF device from the lists is proximate to a stationary presentation device; and
responsive to the determining, providing content to the stationary presentation device, wherein the content is selected, at least in part, according to the location information of the first RF device.

10. The system of claim 9, wherein the first RF device is a non-participating device and the plurality of mobile devices are participating devices.

11. The system of claim 9, wherein the processor is further programmed to initiate executable operations comprising:
determining, from the locations and lists of the plurality of mobile devices, an amount of time the first RF device is proximate to a selected location;
wherein the content is further selected according to the amount of time and the selected location.

12. The system of claim 9, wherein the stationary presentation device and the plurality of mobile devices are indoors.

13. The system of claim 9, wherein the processor is further programmed to initiate executable operations comprising:
determining that the first RF device is proximate to a second RF device determined to be a companion device from historical location information for the first and second RF devices, wherein the content is further selected according to location information estimated for the second RF device.

14. The system of claim 9, wherein:
the lists further specify signal strength for detected RF devices; and
estimating location information for the RF devices further comprises estimating a distance of the RF devices from the mobile devices that detected the RF devices according to the signal strength indicators.

15. The system of claim 9, wherein estimating location information for the RF devices further comprises, for a selected RF device detected concurrently by at least two mobile devices, determining an intersection of the detectable ranges of the at least two mobile devices that detected the selected RF device.

16. The system of claim 9, wherein determining that the first RF device is proximate to the stationary presentation device comprises:
receiving device detection data specifying the first RF device from the stationary display device.

17. A computer program product comprising a non-transitory computer readable storage medium having program code stored thereon, the program code executable by a processor to perform a method comprising: using the processor, continually receiving, from each of a plurality of mobile devices, a location of the mobile device and a list comprising at least one RF device detected by the mobile device while at the location; estimating, using the processor, location information for the RF devices according to the locations and the lists; determining, using the processor, that a first RF device from the lists is proximate to a stationary presentation device; and responsive to the determining and using the processor, providing content to the stationary presentation device, wherein the content is selected, at least in part, according to the location information of the first RF device.

18. The computer program product of claim 17, wherein the first RF device is a non-participating device and the plurality of mobile devices are participating devices.

19. The computer program product of claim 17, further comprising:
determining that the first RF device is proximate to a second RF device determined to be a companion device from historical location information for the first and second RF devices, wherein the content is further selected according to location information estimated for the second RF device.

20. The computer program product of claim 17, wherein estimating location information for the RF devices further comprises, for a selected RF device detected concurrently by at least two mobile devices, determining an intersection of the detectable ranges of the at least two mobile devices that detected the selected RF device.

* * * * *